United States Patent [19]

Ammann et al.

[11] Patent Number: 4,817,517

[45] Date of Patent: Apr. 4, 1989

[54] METHOD AND APPARATUS FOR MAKING FOOD PELLETS

[75] Inventors: Jörg Ammann, Oberuzwil; Hans Peter Schaffner, Niederuzwil; Ernst Ackermann, Egg, all of Switzerland

[73] Assignee: Gebrueder Buehler AG, Uzwil, Switzerland

[21] Appl. No.: 186,702

[22] Filed: Apr. 20, 1988

Related U.S. Application Data

[63] Continuation of Ser. No. 852,828, Apr. 16, 1986, abandoned.

[30] Foreign Application Priority Data

May 9, 1985 [CH] Switzerland .......................... 1962/85

[51] Int. Cl.⁴ .............................................. A23K 1/20
[52] U.S. Cl. ........................................ 99/483; 99/486; 99/534; 100/25; 100/905; 366/77; 366/603; 425/62; 425/200; 425/378.1; 425/376 R
[58] Field of Search ................. 99/467, 516, 534, 536, 99/483, 485, 471, 486, 487; 100/73-75, 903, 905, 907, 909, 125; 425/376 R, 365, 200, 62; 118/16, 20, 25, 26; 366/77, 603

[56] References Cited

U.S. PATENT DOCUMENTS

| | | | |
|---|---|---|---|
| 1,877,266 | 9/1932 | Chapin et al. | 99/483 X |
| 2,240,660 | 5/1941 | Meakin . | |
| 2,700,940 | 2/1955 | Johnson . | |
| 2,739,895 | 3/1956 | Varney et al. . | |
| 2,764,952 | 10/1956 | Fisher . | |
| 2,798,444 | 7/1957 | Meakin . | |
| 2,908,038 | 10/1959 | Meakin . | |
| 3,045,280 | 7/1962 | Bonnafoux . | |
| 3,181,482 | 5/1965 | Heth et al. | 99/534 X |
| 3,191,227 | 6/1965 | Keefe . | |
| 3,280,426 | 10/1966 | Meakin . | |
| 3,288,051 | 11/1966 | Dodgen et al. | 99/534 X |
| 3,307,501 | 3/1967 | Wenger . | |
| 3,332,111 | 7/1967 | Hafliger . | |
| 3,382,818 | 5/1968 | Landers . | |
| 3,538,546 | 11/1970 | Gilman . | |
| 3,581,678 | 6/1971 | Landers . | |
| 3,723,042 | 3/1973 | Raydt . | |
| 3,828,661 | 8/1974 | Vink | 99/485 X |
| 3,932,091 | 1/1976 | Vink . | |
| 3,981,664 | 9/1976 | Bittner et al. . | |
| 4,001,452 | 1/1977 | Williams . | |
| 4,162,881 | 7/1931 | Morse . | |
| 4,183,675 | 1/1980 | Zarow . | |
| 4,446,086 | 5/1984 | Molenaar et al. . | |

FOREIGN PATENT DOCUMENTS

| | | |
|---|---|---|
| 0095168 | 5/1981 | European Pat. Off. . |
| 0040406 | 1/1984 | European Pat. Off. . |
| 0049025 | 1/1985 | European Pat. Off. . |
| 81/02238 | 8/1981 | PCT Int'l Appl. . |
| 81/03076 | 10/1981 | PCT Int'l Appl. . |

Primary Examiner—Timothy F. Simone
Attorney, Agent, or Firm—Merchant, Gould, Smith, Edell, Welter & Schmidt

[57] ABSTRACT

For making food pellets, the raw material is first subjected to a first pelleting treatment under pressure, after which the obtained pelleted product is treated at least in part on a pressure pelleter at least for a second time. A feeding arrangement for feeding the material once pelleted to a pelleting die is respectively arranged either within a single pressure pelleter or between two pressure pelleters connected in series for carrying out such process.

24 Claims, 8 Drawing Sheets

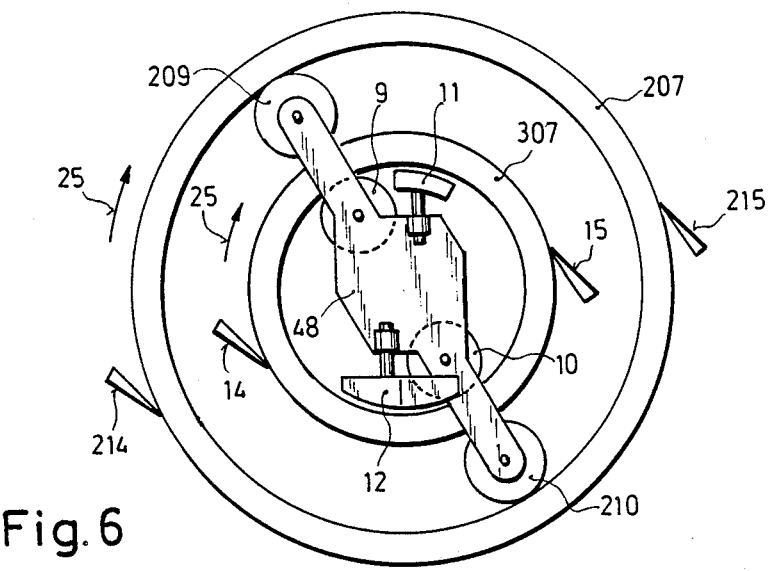
Fig. 6
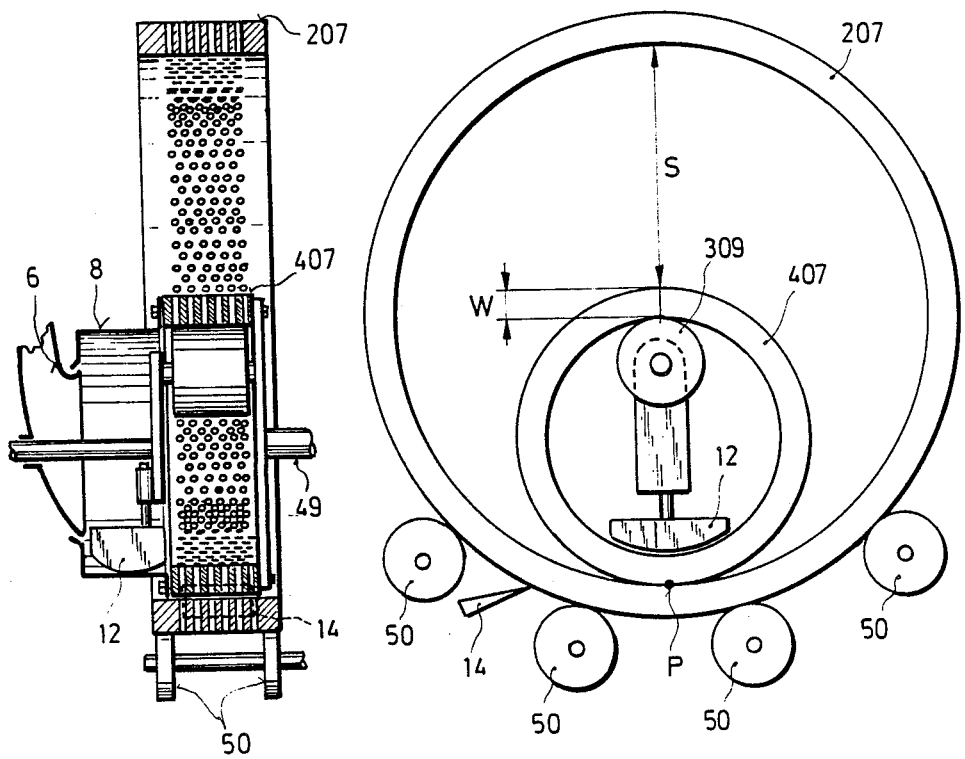
Fig. 8
Fig. 7

METHOD AND APPARATUS FOR MAKING FOOD PELLETS

This is continuation of application Ser. No. 852,828, filed Apr. 16, 1986, now abandoned.

FIELD OF THE INVENTION

This invention relates in general to a method and apparatus for making food pellets by pelleting their components under pressure. The term "food pellets", in this context, should be understood in the broadest sense as comprising any composition adapted to be used as a food, even if it may actually be used in particular for another purpose, e.g. forming a base material for a chemical product.

BACKGROUND OF THE INVENTION

In carrying out such processes, various devices have been employed-such as extruders or devices of the edge mill type, wherein roller-shaped edge runners roll over a substantially flat perforated edge-runner plate-but often pellet mills are used in which at least one press roller rolls on a perforated cylindrical die. Moreover, numerous briquetting devices have been proposed for this purpose, mostly comprising cooperating rollers having recesses which correspond to one half of the pellet shape. All these different types of devices should be comprised under the term "pressure pelleter", used herein.

SUMMARY OF THE INVENTION

It is an object of the invention to improve the methods used hitherto.

It is a further object to improve the quality of the pellets by treating at least part of the pellets obtained in a first pelleting step at least another time on a pressure pelleter.

Another object is to realize such a method in an arrangement which is characterized in that a feeding arrangement is provided which transfers the pellets, obtained from a die after a first pelleting treatment, to a second pelleting operation which may either be effected in the same pressure pelleter or in another one. In the first case, the feeding arrangement forms a back feeding arrangement.

BRIEF DESCRIPTION OF THE DRAWINGS

Further details will become apparent from the following description of embodiments schematically illustrated in the drawings in which FIGS. 1 +2 show a first embodiment of a pellet mill or press with an incorporated back feeding arrangement, FIG. 1 being a front elevation and FIG. 2 illustrating a lateral view in cross-section through the housing of the mill;

FIGS. 3 +4 represent details of a second embodiment, FIG. 3 being a front view, partially in cross-section along the line III—III of FIG. 4, after removal of the housing and of the die cover, whereas

FIG. 6 is a similar front view of a fourth embodiment using concentric dies;

FIGS. 7 +8 illustrate a fifth embodiment in a front view and in cross-section;

Figure 1:
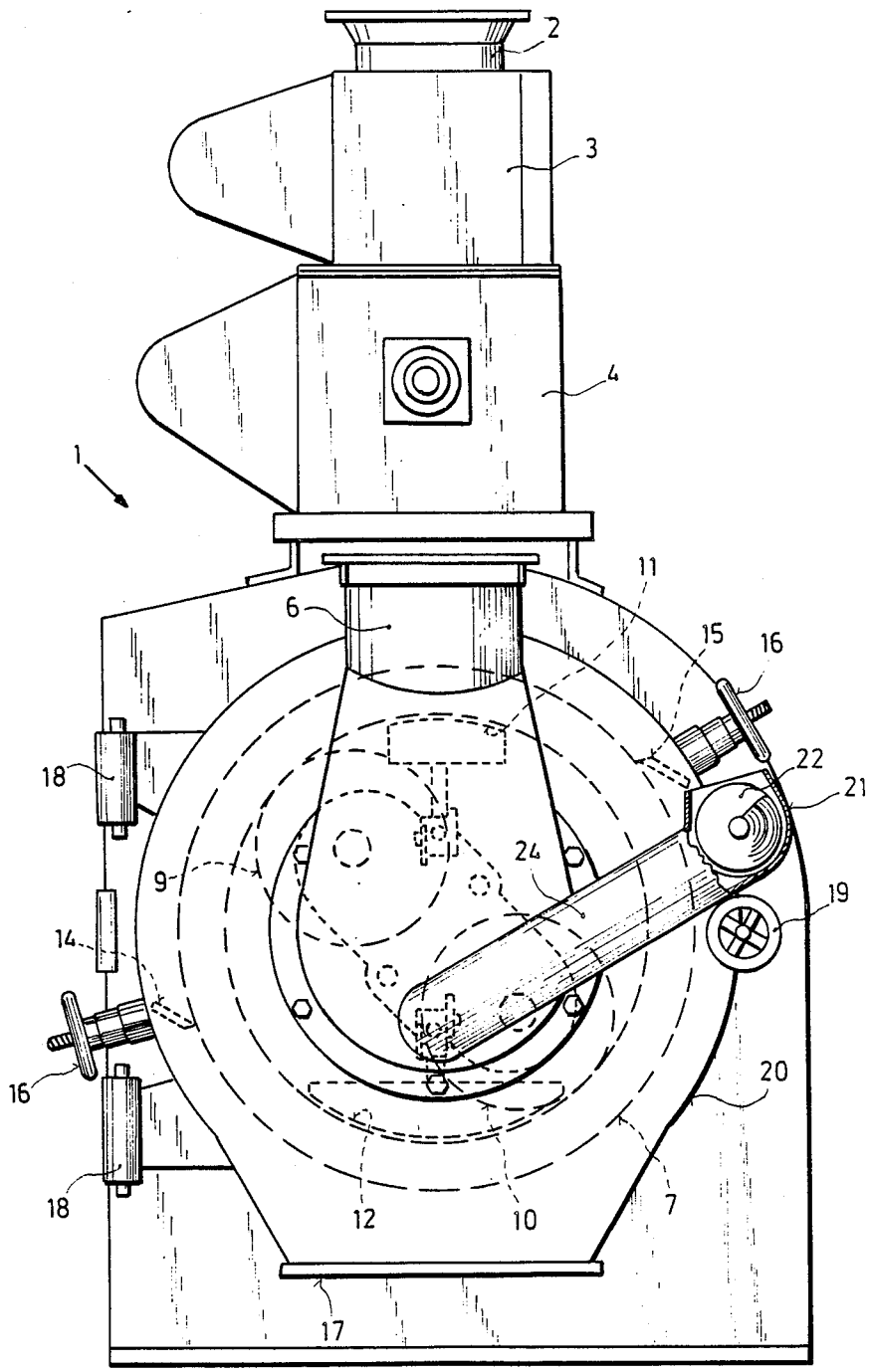
Figure 2:
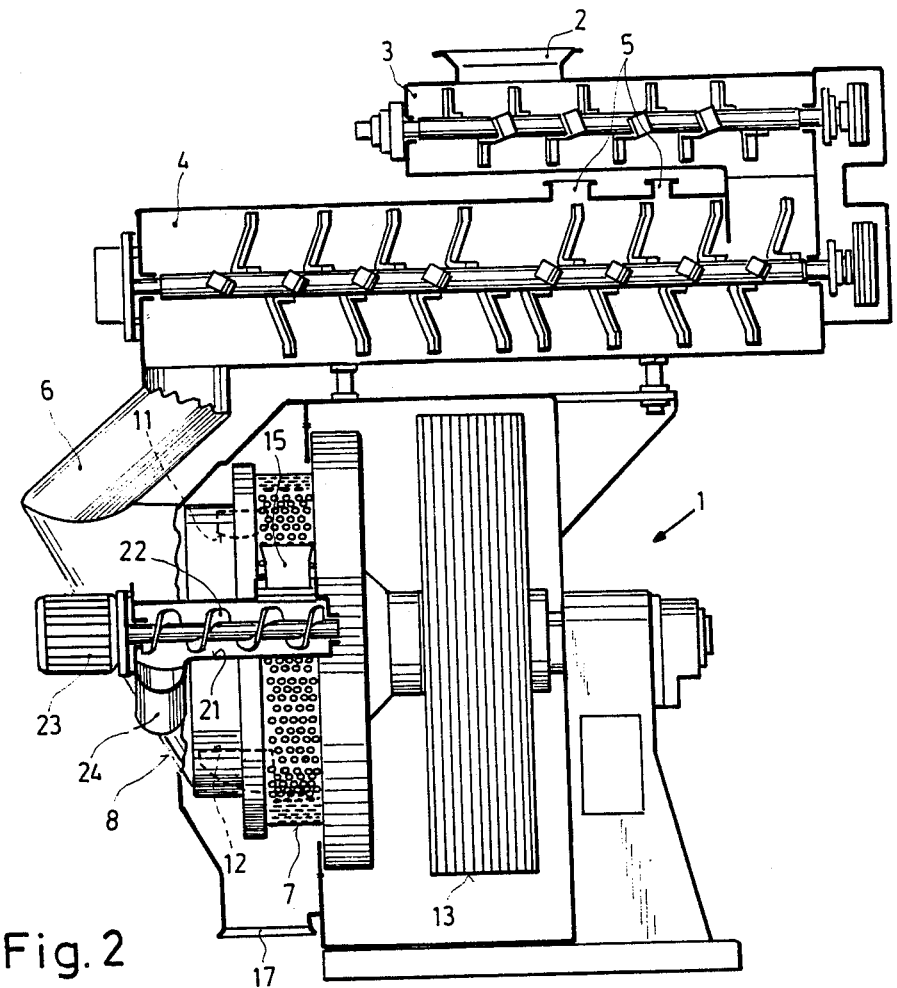

According to FIGS. 1 and 2, the raw material to be pelleted, e.g. from a silo, is filled through a hopper 2 into a feed screw conveyor 3 of a pellet mill or press 1, the feeding member of which being formed as a paddle screw feeding the material to a steam-conditioner 4. This steam-conditioner may have some further connections 5 for supplying steam and/or liquid components and may be provided, in the manner illustrated in FIG.2, with similar paddles as the screw conveyor 3, but, if desired, with some irregularities to promote a certain mixing effect.

Then, the material reaches an inlet chute 6 and is fed to a die cover 8 rotating together with a perforated die 7. From this die cover, the material is distributed to press rollers 9 and 10 by deflector blades 11, 12 being only schematically indicated by dotted lines. The deflector blades 11, 12 are preferably arranged and formed as described in the copending U.S. Pat. application Ser.No. 744,056, the disclosure of which is incorporated by way of reference.

The perforated die 7 may be driven by a belt wheel 13 (FIG. 2) so that the press rollers 9, 10 roll over the inner surface of the die 7 during rotation of the same, whereby the material, scraped off from the inner surface of the die cover 8 by the deflector blades 11, 12, is fed by the latter to the inner surface of the die 7, where the material is pressed by means of the press rollers 9, 10 through the holes of the die which are shown in FIG. 2. Having passed the holes and being pressed in the shape of the holes, the material is stripped off by skimmers 14, 15 (FIG. 1), each being arranged, for example, after a press roller 9, 10, the skimmers 14, 15 being substantially radially adjustable by handwheels 16. The material stripped off in the form of pellets by the skimmers 14, 15 falls then into an outlet 17 from which it is conveyed in any way desired.

The parts described above are of conventional nature and may be modified at will in accordance with the prior art. Moreover, however, the pellet mill 1 comprises a back feeding arrangement which is described in the following.

According to FIG. 1, there is a front housing 20 which, after opening a clamp wheel 19, may be pivoted about hinges 18. The front housing 20 has a protrusion forming a housing 21 for a screw 22 which is rotatably supported and may be either driven directly, e.g. by a separate motor 23 (FIG.2), or geared dwwn by an interposed reduction gear, as is preferred. The screw housing 21 has an opening within the region of the skimmer 15 and being arranged immediately below the same, as is illustrated in FIGS. 1 and 2, so that the stripped pellets fall into the screw housing 21 and are 24 at the other end of the screw housing 21. The pellets, still in warm, moist and relatively weak condition, fall through this inclined chute 24 into the lower end of the let chute 6, where they are mixed with the raw material supplied from above by the steam-conditioner 4, and are fed again to the die cover 8 to be pelleted another time.

At this point, it should be reminded that the pellet press 1, as is ordinary, treats the material in a double way. On the one hand, the material, being conditioned to assume a certain weakness and deformability, is shaped in correspondance with the cross-section of the holes of the die 7; on the other hand, it is inevitable that also a certain comminution effect is connected with the pressure of the rollers 9, 10 against the inner surface of the die 7. Thus, by feeding the material already pelleted once another time to the perforated die 7, the comminution effect is doubled, whereby considerably higher densities of the final product may be achieved. The resulting pellets are more abrasion-proof and/or a raw material may be used which is less adapted per se for pressing it to pellets. This is at least partially due to the fact that the material remains in its hot and moist condition over a longer period so that the individual components are subjected to a better proofing and for a longer time to the influence of heat which has the additional benefit of an improved sterilization effect.

It may be understood that not necessarily a screw 22 has to be employed for realizing a back feeding arrangement, on the contrary, also a mere gravity feed system could be realized to feed the pelleted material, if the tube-shaped housing 21 were suitably inclined. On the other hand, it may be favorable in some constructive realizations to provide a conveying device, e.g. a screw conveyor, particularly formed by a mixing screw, in the channel section 24.

Since, as mentioned above, the pelleted material is fed back through the inclined chute 24 and will necessarily mix itself with the material newly supplied by the steam-conditioner 4 into the inlet chute 6, it may result that part of the material passes the die 7 only once, then being stripped off by the skimmer 14 (FIG. 1) and falling into the outlet 17. On the other hand, some particles of the material may pass several times through the the die 7, according to a random distribution, thereby always being lead from the skimmer 15 to the screw 22. For many applications, this effect will not have a detrimental influence, because, as already said, the finer comminution results in a better compaction and therewith within a better cohesion of the pellets produced in this way. Thus, on average, a better quality will be obtained. As may be seen from FIG. 2 (in correspondence with the abovementioned U.S. Pat. application Ser. No. 744,056), the upper deflector blade 11 extends only over part of the axial length o the die cover 8 and receives the material at first - on account of the transverse position of the lower deflector blade 12 (see FIG. 1) and the resulting impossibility of an immediate access of material from the inlet chute to the die 7 - whereas the deflector blade 12, which extends over the total axial length of the die cover 8, receives the rest of the material.

This effect could be used to introduce the material, which is fed back through the inclined chute 24, either only behind the upper deflector blade 11 and/or into the axial range of the die cover 8 that is not stripped by the deflector blade 11 (FIG. 2) so that the fresh raw material is exclusively fed to the press roller 10 by the deflector blade 11, whereas the material already pelleted once is solely supplied to the press roller 9 through the deflector blade 12. In such a case, it could be suitable to arrange the feed back conduit on the left side (with respect to FIG. 1) in an analogous way, as is represented on the right side in FIG. 1.

Figure 3:
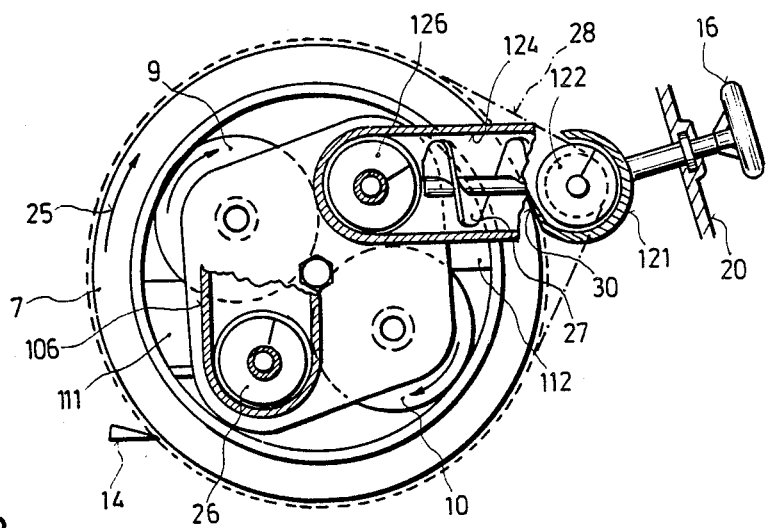
Figure 4:
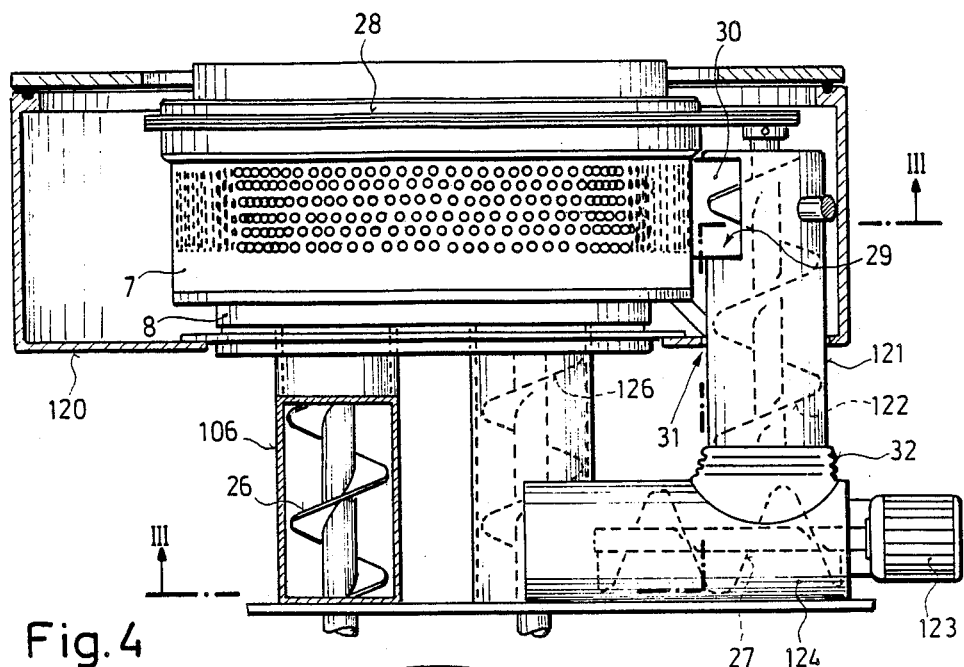
FIG. 4 is the corresponding plan view.

Another possibility of an unequivocal supply of the fresh material and of the already pelleted material to a respectively assigned press roller is illustrated in FIGS. 3 and 4, showing a modification of that screw supply for a perforated die 7 which is known from U.S. Pat. Nos. 3,045,280, 3,932,091 or 4,162,881. All parts of the same function have the same reference numerals as above, all parts of a similar function have the same reference numeral, but with a hundred added. Assume that the die 7 is rotated in clockwise sense according to the arrow 25, as is also the case in the foregoing embodiment. The drive for this rotation is not shown and may be designed as in FIG. 2.

In accordance with the above-mentioned U.S. Patents, the fresh raw material, fed from the supply arrangement 3, 4 (vide FIG. 2), is supplied to a feed screw 26 through a supply chute 106. As is illustrated in FIG. 3, the feed screw 26 is situated before the press roller 9, with respect to the sense of rotation of the perforated die 7.

Before the press roller 10, another feed screw 126 is located, as corresponds to the known arrangement. Differing from that, the screw 126 does not receive the material to be fed to the roller 10 through the inlet chute 106, but through a lateral channel 124 which is substantially horizontally arranged - to the contrary of the inclined chute 24 in the embodiment of FIGS. 1 and 2 - and, therefore, contains a conveyor in its interior, preferably in the form of a screw 27. This screw 27 is driven by a motor 123 merely schematically indicated in FIG. 4.

As in the embodiment described above, the material stripped off from the die 7 is fed by a screw 122 to the channel 124. In this case, this screw 122 is driven through the die drive by means of a chain 28, although it is in general preferred to provide a separate drive for the screw, this drive being pivotable together with the front housing (see 20 in FIG. 1) without any problem. The embodiment of FIGS. 3 and 4 shows, however, that the invention is by no means restricted to a particular construction of the drive.

The screw 122 rotates in a screw housing 121 which has an opening 29 at the end facing the perforated die 7. A flap 30 of this housing 121 is bent out of its cylindrical plane and serves simultaneously as a skimmer. This involves, however, that the complete housing 121 is adjustable in the direction towards the die 7 or away by means of the handwheel 16 (FIG. 3), the adjustment being easily effected in case the screw is either driven by the chain 28 or by a separate motor drive. To this end, an opening 31 in the housing 120, which serves to receive the screw housing 121, needs only to be dimensioned slightly larger than the screw housing 121 in order to allow a transverse movement of the latter. The same is true for the orifice into the lateral channel 124, the connection being covered, if desired, by a flexible bellows 32. If necessary, the transverse channel 124 may be drawn off from the screw housing 121 together with the bellows 32.

From FIG. 3, it may easily be seen that the fresh raw material is first fed to the press roller 9 by the screw 26, thus being pelleted for a first time, after which it is introduced into the screw housing 121 by the flap 30. After pelleting, the material is fed to the transverse channel 124 and the screw 27 by the screw 122, the screw 27 feeding the material for another time to the die 7 via the feed screw 126, whereby the press roller 10 comes into action. Therefore, the skimmer 14 will strip off the, thus, double-pelleted material.

Figure 5:
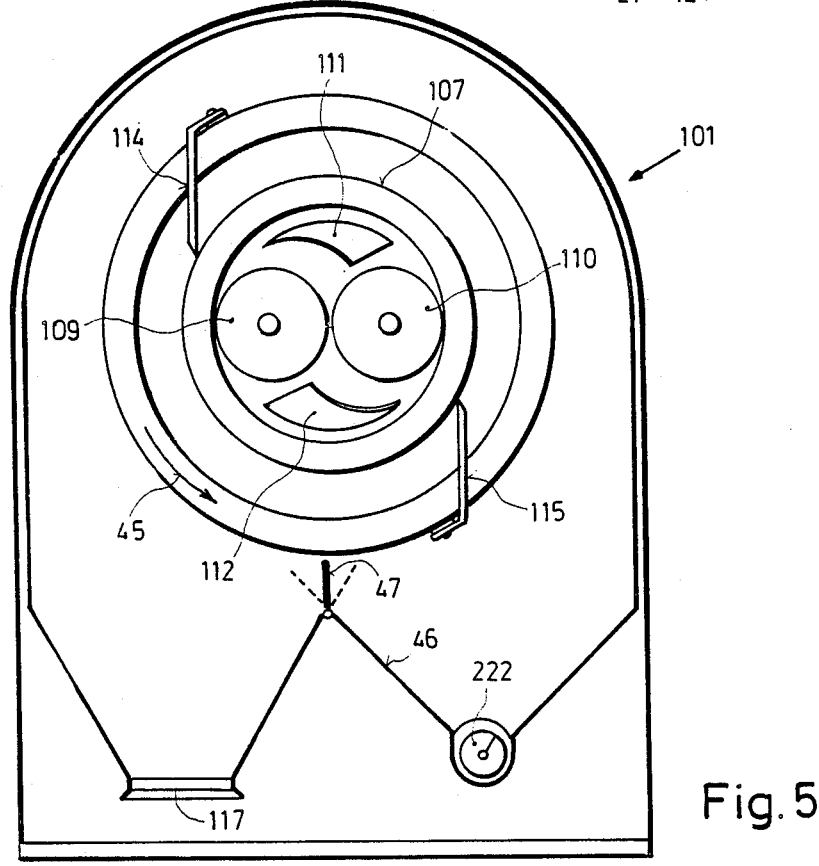
FIG. 5 shows a third embodiment of a pellet mill in a front view to a stationary die.

FIG. 5 shows that the invention is not restricted to be applied to pellet presses with rotating die. To the contrary, the press 101 according to FIG. 5 has a stationary die 107, whereas a plate-like wheel 45 is driven in counterclockwise sense. The wheel 45 bears against either the press rollers 109, 110, which roll on the inner surface of the die 107, and the deflector blades 111, 112 in a manner known per se, as well as two skimmers 114, 115 mounted on the outer surface of the wheel 45 and being suitably formed from a leaf spring material, as is also known per se.

The material, stripped off by the skimmers 114, 115, will fall on the right side of the die 107 (with reference to FIG. 5) into a funnel 46, at the bottom of which a feed back screw 222 is provided. This feed back screw 222 transports the material, which is collected by the funnel 46, outwards and into a channel (not shown) leading upwards to the inlet chute (see 6 in FIGS. 1, 2 or 106 in FIGS. 3, 4) and comprising a suitable conveyor to transport the material upwards. The material stripped off at the left side of the die, however, will directly fall into the outlet 117. The ratio of the material fed into the funnel 46 to that fed into the outlet 117 may, in some cases, be adjustable, e.g. by means of a clack valve 47. This clack valve 47 could be connected to a control circuit in a similar way, as is described later with reference to FIG. 12, the adjustment of the clack valve 47 being effected as a function of the result of measurement of the quality of the pellets.

It is evident that feeding back the material, as is described above with reference to the three embodiments of FIGS. 1 to 5, will result in a decrease of the total capacity of the respective pellet press, because a certain portion of the capacity (i.e. approximately one half) has to be employed for the additional pelleting operation. Now, FIG. 6 shows an embodiment in which the loss of capacity can be avoided, thereby diminishing also the expenditure for the feeding arrangement to the further pelleting operation.

In this embodiment, an inner die 307 is, in principle, equipped with press rollers 9 and 10, as well as with deflector blades 11 and 12, similarily as has been shown with reference to FIGS. 1 to 4. Suitably, the supply of material into the interior of the die 307 is effected through supply means (not shown) which may correspond to the feed screws 26 and 126 of FIG. 3. In this latter case, the deflector blades 11 and 12 could extend farther into the interior of the die 307 and have only a distributing function. In this way, a bearing plate 48 for the press rollers 9 and 10 may be extended beyond the die 307 and may support further press rollers 209, 210 at its extreme ends, said press rollers 209, 210 cooperating with an outer die 207. Two skimmers 14, 15 and 214, 215 are assigned to each of the dies 207, 307 that are suitably driven by a common drive. In this way, the pelleted material stripped off by the skimmers 14, 15 is allowed to fall immediately onto the inner surface of the outer die 207 (i.e. the feeding arrangement is simplified) which entrains and feeds the material to the press rollers 209, 210. By these outer press rollers 209, 210 the material, pelleted already once, is compressed another time through holes of die 207, and, if desired, a third die could be provided outside the die 207 in an analogous arrangement. In some cases, suitable smoothing and distributing devices, such as blades or wipers, may be provided between both dies 207, 307 in order to prevent bulks of material and to ensure an equal distribution of the same. In this connection, it should be mentioned that it is already known to use levelling blades instead of press rollers, said blades enclosing an acute intake angle with the inner surface of the respective die to fill and press the material into the holes. Such an arrangement could be foreseen for the outer die 207, particularly because the space between the two dies 207, 307 is relatively narrow so that the press rollers 209, 210 have a very small radius with respect to the diameter of the die 207. On the other hand, the intake angle could be improved by providing, instead of the press rollers 209, 210, an endless belt supported by several small rollers for pressing the material into the die 207.

The conception of the use of at least two dies arranged one within the other, as described above with reference to FIG. 6, may be modified in accordance with FIGs.7 and 8. However, in this case an eccentric arrangement of the two dies 207, 407 is provided, the inner die 407 serving simultaneously as a press roller within the outer die 207. The difference between the diameters of the dies 207, 407 is here represented, in an exaggerated manner, and in practice it would be preferable to choose a relatively insignificant difference of diameters so that the maximum free space S between the dies 207, 407 corresponds only to about the double or threefold width W (or length of the holes) of the die 407.

Within the inner die 407, several press rollers could be arranged, but it may be useful to provide a press roller 309 at least at the location opposite the point P of contact of the two dies 207, 407 in order to equalize and balance the forces acting upon the inner die 207.

As best shown in FIG. 8, the material is fed through the inlet chute 6 to the die cover 8 co-rotating with the die 407, where the material is distributed over the inner surface of the cover 8 under the action of the centrifugal force and is then stripped off by the deflector blade 12. The deflector blade 12 directs the material into the interior of the die 407, but locks, due to its position at the lower part of the die 407, the flow of material in the case of stoppage of the die. Finally, the material fed into the die 407 is pressed through the holes of the die 407 by the press roller 309, and, with further rotation of the die 407, is then compressed against the inner surface and through the holes of the die 207 to be stripped off at last by the skimmer 14. In doing this, the outer die 207 is either entrained by the drive of the inner die 407 via a shaft 49 and need only to be supported, or it has a separate drive through supporting wheels 50, in which case a separate drive for the inner die 407 may also be ommited, if desired. In order to prevent the material from being pressed back through the holes of the inner die 407, a suitable pressing device, e.g. one or two press rollers, may be located within the region of the point of contact P at the inner surface of the die 407. However, an arrangement of the press rollers is preferred, in which the axles of two of them are situated in a horizontal plane on each side of the axis of rotation of the die 407. Tests have shown that such an arrangement is most favorable with respect to the occurring forces.

If the outer die 207 has a separate drive, the same engages suitably the marginal surfaces, as is shown in FIG. 8. Thereby, the drive may be realized in the form of a mere friction drive, as is usual with large tube mills, but it would likewise be possible to provide toothed rims. Just in the case of a friction drive, it may be suitable to arrange the surfaces of the die 207, which engage the drive wheels 50, on another diameter than the perforated outer surface so that any danger of fouling of the driving surfaces by the pelleted material is avoided. If desired, suitable shielding means, such as sheets or the like, may be provided. Normally, however, it will be sufficient and most suitable to arrange the bearing surfaces of the outer die, which are engaged by the drive wheels 50, on a smaller diameter than the perforated outer surface.

The conception of at least two adjacent die surfaces in the application to a double-pelletizing operation, which has been described above with reference to FIGS. 6 to 8 and to radially adjacent dies 207 to 407, may also be realized by arranging the die surfaces in axially adjacent relationship, as is explained below with respect to FIGS. 9 to 11.

Figure 11:
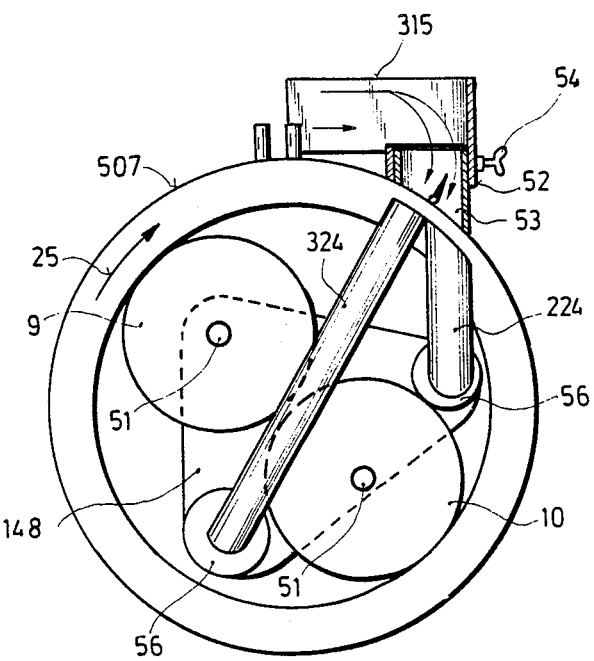

According to FIG. 11, a ring die 507 is rotated in clockwise sense (see arrow 25), the respective drive being not shown, but being realized, for example, in an analogous manner, as is illustrated in FIG. 2. Press rollers 9, 10 are rotatable within the interior of the die 507, as before, the axles 51 of which being held by a stationary plate 148. This plate 148 may additionally be supported in any manner known per se. Further parts, which are present in usual manner, but are not shown, may be formed by suitable deflector blades and a skimmer for the final product which corresponds to the skimmer 14.

Figures 9, 10:
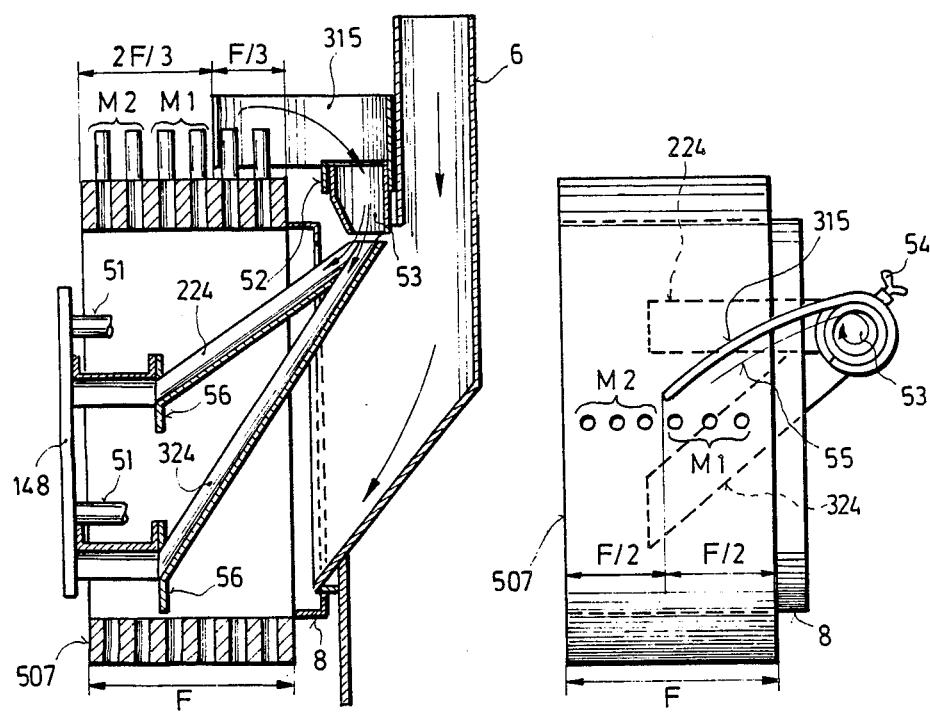
FIGS. 9–11 show a sixth embodiment, FIG. 9 being an axial cross-section of it, FIG. 10 being a plan view in the direction of the arrow X in FIG. 9, and FIG. 11 being a front view;.

The press rollers 9, 10 are omitted in FIG. 9 for the sake of clarity, but extend over the whole axial width of the die 507 and cooperate with the whole perforated inner surface of the die 507. The outer surface F of the die 507 is, however, subdivided in the position of the skimmer 315, shown in FIG. 9, into a strip-like surface 2F/3 and into a further strip-like surface F/3, although in the position of the skimmer 315 according to FIG. 10 it is subdivided into two strips F/2. For enabling this adjustment, the skimmer 315 is connected to a socket 52 (FIGS. 9, 11) which may be turned on a funnel tube 53, connected to the inlet chute 6, into any desired position, and may be fixed, e.g. by clamping by means of a wing bolt 54. Of course, it is also possible to provide notches for predetermined positions. In this way, the skimmer 315 may be turned into an inoperative position, if desired, in which it does no longer extend over the surface F of the die 507. Since the skimmer 315 is guided by the socket 52, it may also easily adjusted in height. Immediately below the funnel tube 53, inclined chutes 224, 324 are arranged which, in some cases, may be formed as open chutes (as is illustrated), and which feed the pelleted material to the press rollers 9, 10 after being stripped off by the skimmer 315, thereby falling into the funnel tube 53 due to the high surface speed of the die. However, the pelleted material which is stripped off from the surface strip F/3 is fed to the surface strip 2F/3 which is not stripped by the skimmer 315 so that the material M2 passing through the holes of this strip 2F/3 has been subjected to a double pelleting treatment, whereas the material M1 (FIG. 10) is only once pelleted. In some cases, it may be desirable to produce a mixture of both materials M1 and M2, and this could be effected in a position of the skimmer 315 according to FIG. 9, whereby the material M1 in the middle is stripped off by a further skimmer not shown. However, when it is desired to subject the whole material to a double pelleting treatment, the position of the skimmer 315 shown in FIG. 10 has to be chosen.

When the material M1 has been supplied through the inlet chute 6 and has been pressed by the press rollers on the surface strip which lies adjacent to the inlet chute 6, it impinges on the skimmer 315, whereby a trajectory of the material M1 will result which corresponds to the arrow 55 (FIG. 10) due to the high peripheral speed of the die 507. If necessary, additional guide means could be provided. The material M1, thus being caught by the skimmer 315, is fed to the left-hand strip (with reference to FIGS. 9 and 10) via the inclined chutes 224, 324, so as to be pelleted another time by means of the press rollers 9, 10. This double-pelleted material M2 is then stripped off by the skimmer 14 which is not shown in FIGS. 9 to 11 (see the preceding FIGS.). However, if it is desired to produce material which is pelletized only once, the skimmer 315 is either completely removed or it is displaced into a. position in which it assumes a substantially parallel position to the planes of the front surfaces of the die 507 or of the die cover 8.

In order to adjust the inclined chutes 224, 324 in accordance with the respective position of the skimmer 315, the chutes are suitably exchangeably mounted on the plate 148. Partitions 56, connected thereto, are substantially disk-shaped in the embodiment shown (FIG. 11), particularly in the lower region of the die 507, but preferably extend over a relatively large range, similarly to the deflector blades 12 (see FIG. 1), in order to prevent that the material to be pelleted for the first time from reaching the surface strip for the already pelleted material to be pressed a second time. If desired, instead of providing exchangeable inclined chutes 224, 324, also telescopically extensible. ones could be arranged which consist of individual lengths of channels. Likewise, the attachment on the plate 148 (or another stationary mounting facility) has to be releasable or adjustable.

It is to be understood that, instead of a single die 507, in some cases also two or more dies may be arranged which are more or less adjacent to each other in axial direction. Likewise, it may be understood that instead of the feed back arrangements shown in the preceding embodiments, feeding arrangements to a remote pressure pelleter could be provided in an analogous manner, especially if it is desired to use different sizes of holes for the different pelleting treatments, although it would be possible to provide different hole sizes on a single die, e.g. on the surface strips 2F/3 and F/3. Furthermore, the the principle of a peripheral drive for a die, as shown in FIGS. 7 and 8, may also be applied, of course, in the other embodiments, as it is likewise possible to drive a die from the interior. Moreover, combinations of radially and axially adjacent die surfaces, e.g. a combination of the embodiment according to FIGS. 6, 7 or 8 with that of FIGS. 9 to 11 could be useful just when the material should be pelleted more than twice. Another modification may consist in arranging dies of different diameter (if necessary by any reason) in axially adjacent relationship in the manner of FIGS. 9 to 11. Finally, it should be pointed out further that with the skimmer 315 in inoperative position, both surface strips (i.e. the total surface F of the die 507) operate practically "in parallel", and such an operation in parallel is, of course, also possible in the case of FIGS. 6 to 8, whereby care has only to be taken that raw material is also supplied to the outer die 207 and that the pelleted material, stripped off by the skimmers, is separately discharged.

It should be remembered that at least one of the effects and objects of a plural pelleting treatment consists in an improvement of the quality of the final product. It is clear that pelleting twice results in an increased energy consumption for the double treatment. In the following, a method should be described with reference to FIG. 12, how to diminish such elevated energy consumption.

Figure 12:
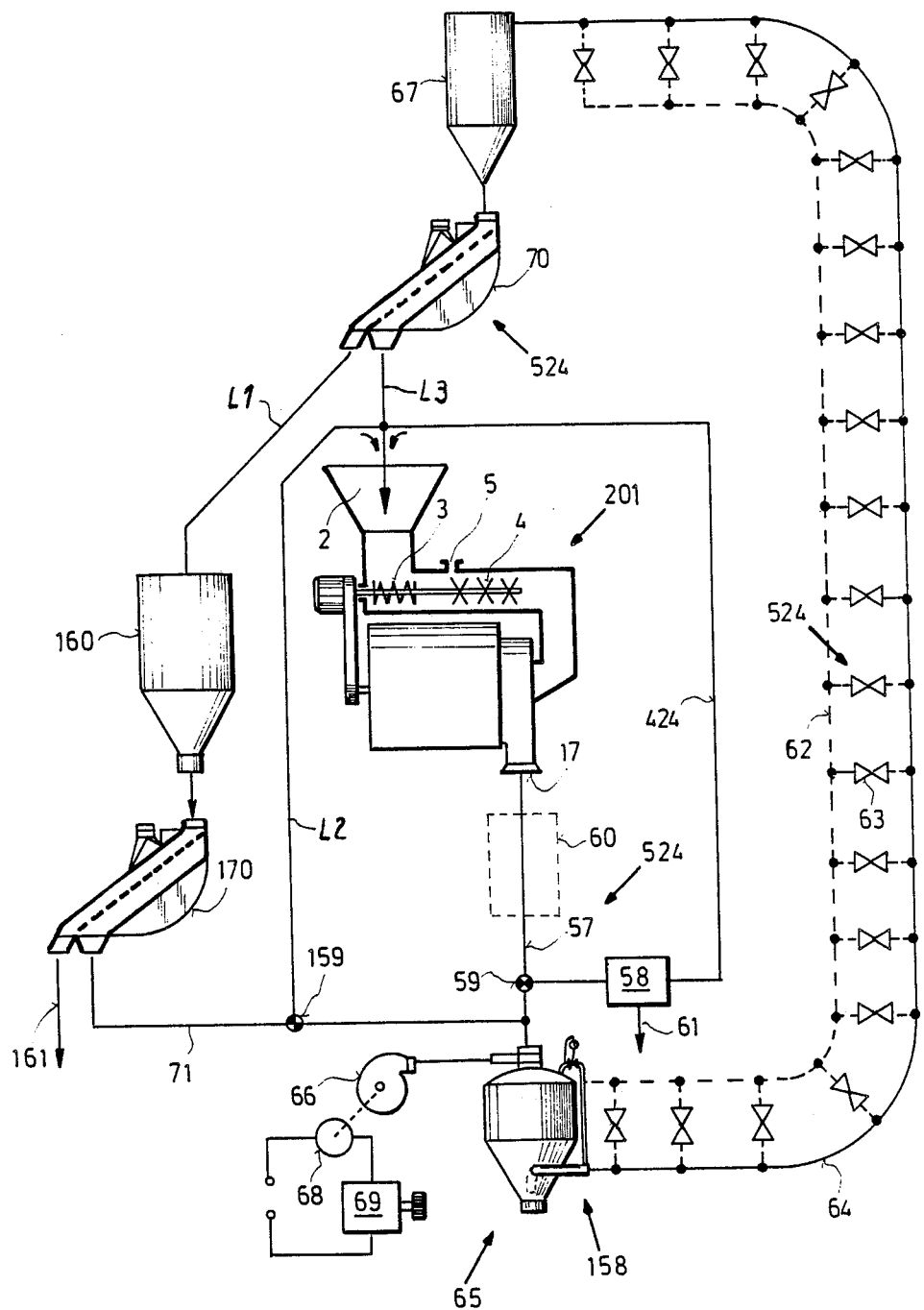
FIG. 12 is a milling diagramm according to a seventh embodiment.

In the milling diagramm shown in FIG. 12, a pellet press 201 is provided comprising a screw feeder 3 and a steam-conditioner 4 which may be arranged on a common shaft. Steam may be introduced through a steam inlet 5. The pelleted product, falling through the outlet 17 of the pellet press 201, reaches a transport line 57 which feds the pellets either to quality control or testing means 58 of generally known type or to a special quality testing arrangement 158. For the selective use of one of these quality testing means 58 and 158, a selector device or valve 59 is schematically indicated as a two-way acting valve, but in practice, this valve 59 will be designed in a similar way, as described later with reference to FIG. 15. A cooling arrangement 60 may be interposed within the line 57, if necessary.

The quality control or testing device 58 may be designed either according to one of the embodiments of EP Pat. No. 40,406, or in accordance with the respective prior art. As a result, the pelleted material, which corresponds to a predetermined nominal quality or standard, will be obtained at the output of the quality testing device 58 in an outlet line 61 to be devoted to further use, whereas small particles of pellets, fragments and pelleted material not corresponding to the quality requirements are fed back to the pellet press 201 through a feed back arrangement 424, specifically it is preferably fed back in this embodiment to the inlet hopper 2 in order to be conditioned for another time.

However, it is preferred to use a pneumatic quality testing arrangement 158 instead of of the quality testing device 58, which is of any other type. In principle, it may be designed in the way described in the EP-Pat. No. 95,168, i.e. essentially formed by a pneumatic line with incorporated baffles. The baffles may be simply formed by pipe elbows. For a more delicate material used, and especially if the cooler 60 within the line 57 is omitted, a low-velocity conveyor (dense-phase conveyor) may be applied, which may comprise a secondary pipe 62 indicated in dotted lines including valves 63, through which air is blown into the primary pipe 64 conveying the product in order to divide the same into individual slugs and to co-act in conveying the latters, as is known per se. A usual material pick-up apparatus 65 of any known construction((which need not be designed in the manner illustrated) is provided to introduce the pelleted material from the line 57 into the pneumatic pipe 64. Pressurized air is supplied to this pick-up apparatus 65 by a blower 66 so that the material, falling from the line 57 onto the bottom of the apparatus, is pressed into the orifice of the pipe 64 located within that region. Simultaneously, air is introduced in known manner into the secondary pipe 62 from the upper part of the apparatus.

In this case, the naturally occurring pipe elbows and the friction at the walls of the pipe 64 may be sufficient to stress the pelleted material so that pellets of unsatisfactory quality will crumble, whereas material corresponding to the requirements will reach a cyclone separator 67 undamaged. The advantage of the use of a pneumatic quality testing arrangement consists in a simultaneous cooling of the pelleted material, whereby a quality test is facilitated. Therefore, it is preferred, if eventual baffles or pipe elbows or the like are not provided before the second half of the length of the pipe 64 with possible exception of the initial elbow within the pick-up apparatus 65.

Of course, in general the pipe 64 cannot be extended or shortened at will to adapt it to different nominal qualities, although this would also be conceivable in some cases. For example, one possibility for the adaption to different quality requirements consists in that the blower 66 is driven by a motor 68 of adjustable speed, whereby an setting device 69 is foreseen to adjust the speed of the motor 68 and for the adaption to the respective desired nominal quality.

At the outlet of the cyclone 67, the tested material reaches a separating device 70 which preferably is formed by a sieve, as illustrated. The separating device 70 forms practically a component of the testing arrangement 158, whereas in the case of the testing device 58, the separating device may be integrated in the same, thus not forming a separate component. The sieve of device 70 is relatively wide-meshed so that undamaged pellets remain on the sieve deck and will be tailed over, whereas fragments and particles fall through and are supplied through a line L3 to the inlet hopper 2. The overs are then fed through a line L1 to a cooler 160, inasmuch as the pelleted material is not already sufficiently cooled within the pneumatic pipe 64 and the cyclone 67, in which case a separate cooler 160 could be omitted. However, if a cooler 160 (of known construction) is foreseen, it will be suitable to locate a further separating device 170 past the cooler 160, the overs of which being fed to an outlet line 161 which, in some cases, may then be combined with the line 61, leading to a storage bin for the final product or to another application. To the contrary, fines and fragments will be fed into a line 71. Line 71 either feeds the material of insufficient quality directly back through a line L2 into the inlet hopper 2, or indirectly back through the pick-up apparatus 65, but the first-mentioned variant is preferred. If a selection facility should be desired, a selector valve 159 (corresponding to the valve 59) may be provided. As shown, lines L2, L3 and 424 are all leading to the hopper 2.

The fact, that the feed back line 424 or the feed back arrangement, consisting of the lines 57, 62 to 65, 67 and 70, feeds only that portion back which does not correspond to the quality requirements, saves the energy for the renewed treatment of that portion of pelleted material which corresponds already to the nominal quality and need not further be subjected to a pelleting treatment.

Although the expenditure in realizing one of the above embodiments, which are designed in particula for a plural pelleting treatment of the material, is relatively small, and though it is relatively easy, e.g. with an embodiment according to FIG. 4, to remove the screw housing 121 as well as the chain 28, when it is desired to pelletize only once, similarily as an embodiment according to FIG. 6 might be operated as a normal pressure pelleter by removing the outer die 207 ad the rollers 209, 210, it should not be overlooked that the demand for such special constructions will possibly be restricted to a small number of pieces. Therefore, a construction will now be described with reference to FIGS. 13 to 16, in which standard parts can be used, substantially without essential structural changes, each of which being adapted to be either applied for a simple pelleting treatment as well as a plural one.

To this end, the construction consists sunstantially of two pellet presses 301, 401 (FIGS. 13, 16) being, in principle, independent from each other and each one being adapted to be applied for single pelleting treatment. These two pellet presses 301, 401 are arranged side by side with parallel axles of rotation in a space saving manner, the steam-conditioner 104 of the pellet press 301 being transversly placed and being connected to the screw feeder 203 of the pellet press 401. This screw feeder 203 receives the raw material through an inlet hopper 202, as known per se. The raw material, after a conditioning treatment in the steam-conditioner 104, is pressed to pellets for a first time (or already a further time, if a pelleting treatment has already been effected) in the pellet press 301, and the pellets obtained at the outlet 217 may be fed through a supply arrangement 624 to the inlet chute 206 of the pellet press 401. The supply arrangement 624 may have a screw conveyor 622, as is illustrated, which is driven by a motor 623.

The material, already pelleted once in the pellet press 301 fed to the pellet press 401 through the supply arrangement 624, is then subjected to a further pelleting treatment in the pellet press 401 and leaves the same at the outlet 317 of it.

Figure 14:
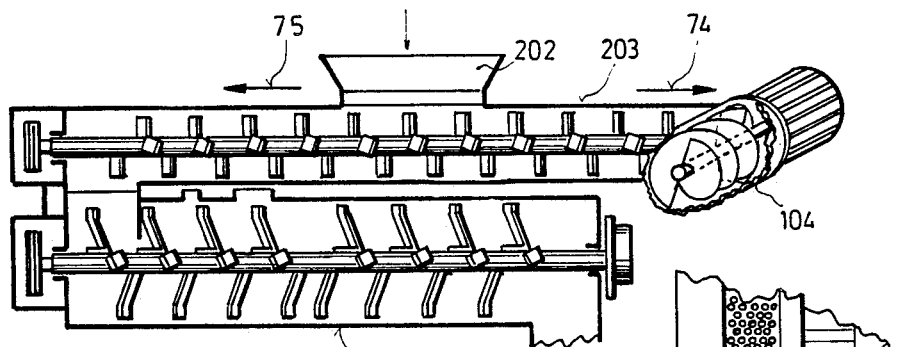

If, however, it is desired to carry out a single pelleting treatment, e.g. for other raw materials, instead of the above-described operation in series in which the pellet press 301 precedes the pellet press 401, the arrangement shown may also be applied. For explaining the anner of operation, first FIG. 14 shall be described. This FIGURE shows the screw feeder 203 and, below, the steam-conditioner 204 of the pellet press 401. The driving motor 72 (shown in FIG. 16) for the paddle screw of the screw feeder 203 can be operated in both directions of rotation by means of a reversing stage 73. In one direction of rotation, the material entered through the inlet hopper 202, which is situated approximately in the middle of the screw feeder 203 accordingto FIG. 14, is fed to the steam-conditioner 104 in the direction of the arrow 74. Thus, the material passes successively the pellet presses 301 and 401 to be pelleted twice. For effecting a single pelleting treatment by operating the presses 301, 401 in parallel, the sense of rotation of the motor 72 (FIG. 16) is reversed by means of the reversing stage 73, and the screw feeder 203 feeds the material, which enters through the inlet hopper 202, in the direction of the arrow 75 (FIG. 14) to the steam-conditioner 204.

Figure 16:
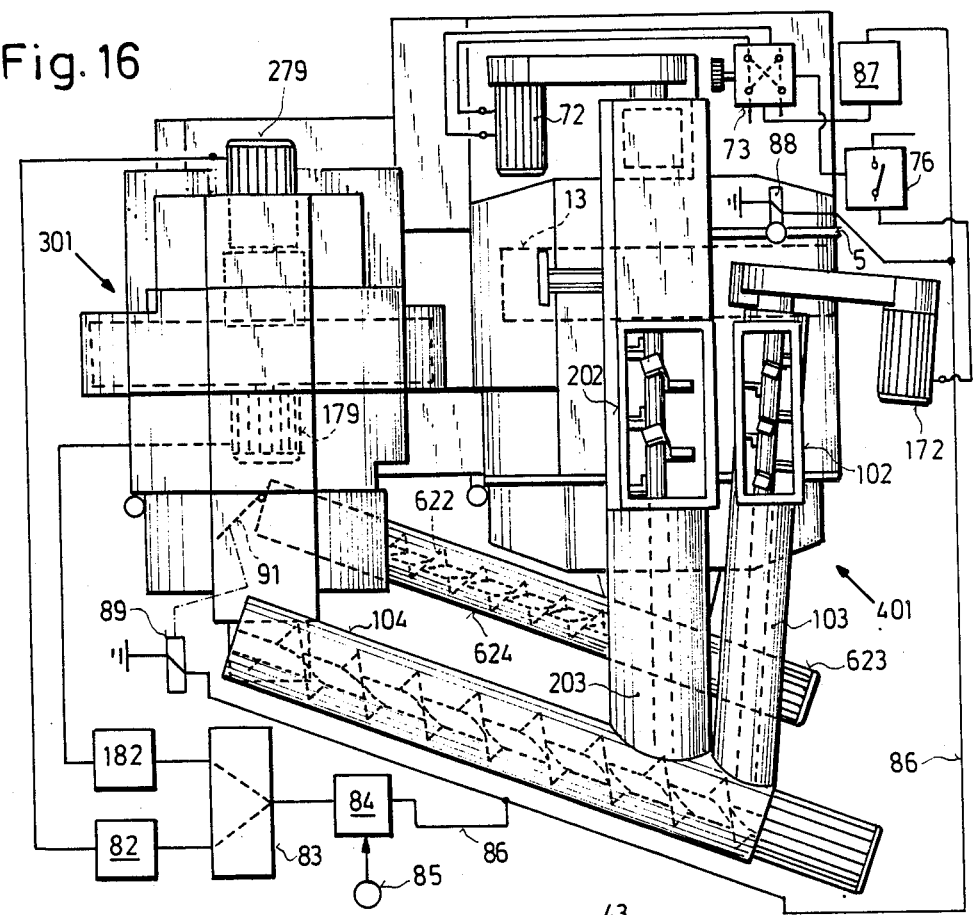

Thus, the steam-conditioner 104 would remain without supply, for which reason a further inlet hopper 102 is connected to a further screw feeder 103. This screw feeder 103 discharges into the steam-conditioner 104, as illustrated in FIG. 16. FIG. 16 shows also that the reversing stage 73 is connected via an outlet line to a switching stage 76, so that with changing over to an operation in series, i.e. when the motor 72 (FIG. 16) has a sense of rotation corresponding to the arrow 74 in FIG. 14, the current supply to the driving motor 172 of the screw feeder 103 is automatically interrupted. Moreover, it should be mentioned that in the embodiment shown the steam-conditioners 104 and 204 are designed in different manner, although they may, of course, also be equally constructed and may be of any suitable design. It will be clear that there are various modifications possible with respect to feeding. For example, instead of two screw feeders 103, 203, a single one may be provided which has enough capacity for feeding two pellet presses 301, 401, the output of which being reversible in such a way that it is selectively connected only to the steam-conditioner 104 for effecting an operation in series, whereas for an operation in parallel both steam-conditioners 104, 204 are fed. To this end, the motor 72 could be a two-speed motor which, during operation in series, is switched to a lower speed so that the oversized capacity of the common screw feeder is reduced, whereas in the case of an operation in parallel, in which the two steam-conditioners 104, 204 are each connected to the output end of their common feeder, the motor for this feeder is operated with the higher speed. Thereby, it may be suitable, if the ratio of the amounts of material fed from the common feeder to the two pellet presses during parallel operation is adjustable, and is in particular controlled as a function of the motor power (current consumption) of the motor of at least one of the presses 301, 401. This control might be effected by means of an extreme-value selector in an analogous way to the control described later. Furthermore, it is evident that only one press 301 or 401 may be operated, if desired, in which case, for example, the switch 76 remains interrupted.

In order to make it easier to connect the output of the common screw feeder to the steam-conditioner 204, the latter could be realized in two stages, as is proposed in the U.S. Pat. No. 4,001,452, whereby the upper stage of the steam-conditioner has its inlet at that side where the inlet of the steam-conditioner 104 is provided, this upper stage feeding the material at the left end (with respect to FIG. 14) into the lower stage, which in turn is oriented in the same direction as the steam- conditioner 204. In this way, the outlet and the inlet of the common screw feeder could be situated on the same side to face the steam-conditioner 104. For the case of stoppage of the motor 172, a bin shutter may be provided which interrupts the further supply of material to the hopper 102.

Figure 13:
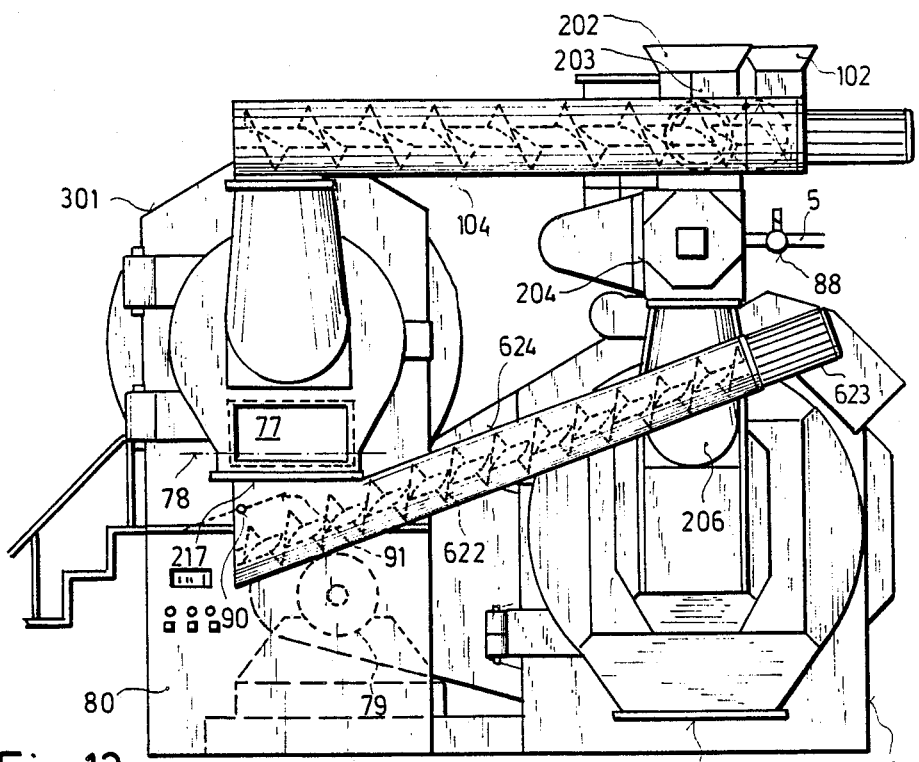
FIGS. 13–16 represent an eight embodiment, the FIG. 16 deferring slightly from FIG. 13 with re spect to the drive, FIG. 13 being a total front elevation, FIGS. 14 and 15 illustrating details in cross-sectional views, and FIG. 16 being a plan view together with a block wiring diagramm, FIG. 17 showing details of the latter.
Figure 15:
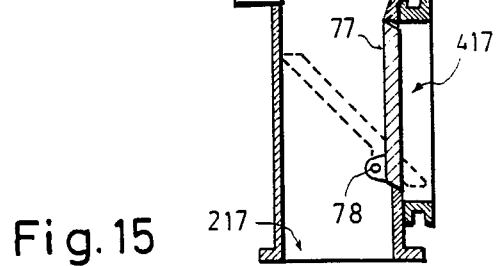

For the operation in parallel, it is evident that an outlet for the pellet press 301 has to be created which is arranged in parallel to the outlet 317 of the pellet press 401. To this end, the feeding arrangement 624 might comprise a respective closing lid following the outlet 217, but in this case, the feeding screw 622 could disturb and would have to be shortened in such a way that it does not extend til the left-hand end of the channel 624. Therefore, it is more favorable to provide an arrangement, as illustrated in FIGs. 13 and 15, in which an outlet opening 417 is covered by a lid 77. The lid 77 is pivoted about an axis 78 and may be displaced into the position shown in dotted lines in FIG. 15 in which the outlet opening 217, which is connected to the feeding arrangement 624, is shut, whereas the outlet opening 417 is unblocked. In this way, the pellet presses 301, 401 may selectively operated in parallel or in series, so that special pressure pelletizers are no longer necessary for carrying out a plural pelleting treatment. Moreover, the pellet presses 301, 401 can better be utilized by using them selectively for an operation in parallel.

As may easily be seen from FIG. 13, both pellet presses 301, 401 may have a common motor 79. But it is likewise possible to provide two motors 179, 279, as illustrated in FIG. 16, which may be arranged in aligned relationship, as to be not separately visible in FIG. 13. The control stages 73 and 76, described above, could be arranged in a steering frame 80 below the pellet press 301 in which also the elements of a control circuit, described below, may be accommodated. When the two pellet presses 301, 401 are operated in series, it is practically inevitable that the presses are differently charged at different times. For example, at the beginning of operation, the material, supplied through the inlet hopper 202, through the screw feeder 203 and via the steam-conditioner 104, will only charge the pellet press 301, whereas the press 401 will execute an idle motion, inasmuch as one does not fear the expenditure of energizing the motor 279 for the drive of the drive wheel 13 of the pellet press 401, only in the moment when the material reaches the inlet chute 206 (FIG. 13), which moment might be determined, for example, by a suitable feeler in the feeding arrangement 624 or simply by a slow-releasing device of a predetermined time constant. In an analogous manner, the feeler (or the slowreleasing device) might switch off the pellet press 301 at the end of operation when the pellet press 301 is already empty and would execute an idle motion, whereas the pellet press 401 has already to work. Also during operation, a different charge of the two presses 301, 401 will occur due to control oscillations or hunting and due to different amounts of supplied material.

If one would provide a control influenced by the charge of both motors 179, 279, a falsification of the control would result, when the one pellet press is maximally charged, whereas the other one is idling, such falsification being detrimental to an optimal operating condition. It is, therefore, preferred to provide a measuring arrangement for the respective power of the two pellet presses 301, 401. This measuring arrangement may, in principle, be formed in any way, but consists suitably and simply of a measuring circuit 82 and 182 for the current consumption of the motors 179, 279. Such measuring arrangements are known per se and need not be explained in detail. The output signals of the two measuring circuits 82, 182 are supplied to an extreme-value selector 83 which transmits only that signal to a control circuit 84 which corresponds to the higher power. Therefore, this extreme-value selector 83 will be constituted, in practice, by a maximum selector, but it is also conceivable to interpose an inverting stage between the measuring circuits 82 and 182, on the one hand, and the extreme-value selector 83, on the other hand, so that the latter has to be a minimum selector. The structure of such an extreme-value selector is known per se, but will be described later with respect to different modifications (a) to (e) shown in FIG. 17, for the sake of a better understanding. The control circuit 84 receives also a nominal value signal from a nominal value transmitter 85 and produces a corresponding control signal at its output, delivering it to an output line 86. This output line 86 is represented in FIG.16 as a mere stroke, but it may comprise various transforming and shaping stages in view of the different types of the final control elements to be actuated. Such a transforming stage (in the broadest sense) is represented as a control stage 87 of known type within the circuit of the feeder motor 72.

Consequently, feeding is respectively adjusted according as which one of the pellet presses 301 or 401 has just reached its maximum power. Since different time constants have to be considered when adapting the power of the feeder motor 72 to the maximum power of either the pellet press 301 or 401, the control circuit 84 together with the selector 83 may have a different controller action with different time constants as a function of whether the measuring signal transmitted by the selector 83 stems from the measuring circuit 82 or 182.

In principle, however, various other control facilities may alternatively or additionally be foreseen. For example, a solenoid valve 88 in the steam supply line 5 might be actuated through the line 86 so that the consistency (e.g. the viscosity), the temperature and/or the hydrolization of starch of the material fed to the pellet presses is altered. A further possibility consists simply in that a lid 91 (in FIG. 16 only schematically indicated), pivoted about a center axis 90 (as shown in FIG. 13), may be turned into the inclined position shown in FIG. 13, in which an opening of the feeding arrangement 624 is unblocked, as to lead part of the pelleted material from the outlet 217 to the exterior. This material may then be fed, for example, to another pellet press.

It is to be understood that the control circuit 84 may actuate various final control elements in accordance with different interrelationships and functions, as has become known for a single pelleting treatment, e.g. from the U.S. Pat. Nos. 2,700,940 or 4,183,675, but also from the PCT-publications Nos. WO 81/02238 or WO 81/03076.

Figure 17:
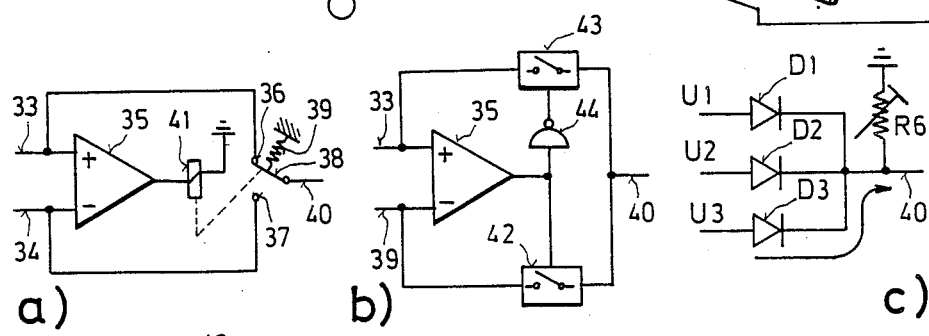
Figure 17:
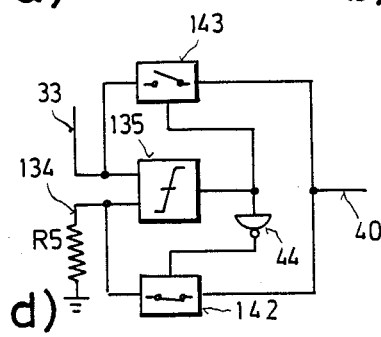
Figure 17:
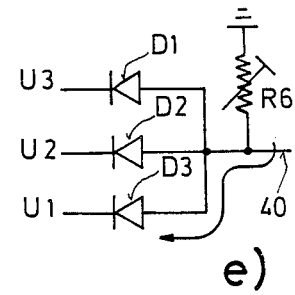

For a better understanding, the function of the selector circuit 83 shall be explained with reference to different embodiments according to FIG. 17. In the embodiment (a) of the five different modifications of a selector circuit 83 of FIG. 17, each measuring signal, to be compared and selected, is supplied through one of two input lines 33, 34. A comparator stage 35 is connected to the input lines 33, 34, said stage being formed by a differential amplifier of a high amplification factor.

Two contacts 36, 37 are also connected to the input lines 33, 34. A change-over switch has a movable switching contact 38 which, normally, lies on a stationary contact 36 under the action of a spring 39 so that the signal of the input line 33 can immediately reach an output line 40 via the contact 36. However, this is only the case when the value of the measuring signal in the input line 33 is smaller than that of the line 34. But when the value of the measuring signal of the line 34 falls below that of the line 33 by only a small amount, this small difference is amplified to such an extent that a signal will result at the output of the comparator stage 35, said signal energizing a relay magnet 41 which draws the movable contact 38 against a stationary contact 37. Thus, the signal from the line 34 reaches immediately the output 40.

Thus, the circuit has substantially the function of a gate circuit which transmits an input signal only under predetermined conditions. This will be more evident from the cescription of the embodiment (b) in which switching stages 42 and 43 are respectively connected to the output of the comparator stage 35, the one directly, the other indirectly through an inversion member 44. Supposing now that also in this embodiment the comparator stage 35 is formed by a differential amplifier of high amplification factor, a signal will be obtained at the output of the comparator stage 35 already in the case of a small positive difference that actuates immediately the switching stage 42 in the sense of connecting through the input line 34 to the output 40. On the other hand, an evident signal is obtained at the output of the comparator stage 35 in the case of only a small negative difference, the signal being made positive by the inversion member 44, thus actuating the switching stage 43 in the sense of connecting through the line 33 to the output line 40. To this end, the inversion member 44 is only needed to enable an analogous structure of both switching stages 42, 43, but it would also be possible to design the switching stage 43 in such a manner, that it is actuated by a negative signal so that the inversion member 44 can be omitted.

The embodiment (d) shows that it is not forcibly necessary to compare two measuring values with each other, but it is also possible to compare the value of a measuring signal, supplied through the line 33, with a fixed value predetermined by a resistance R5 (or by a voltage divider) by means of a threshold value switch 135, the resistance R5 being connected to the threshold value switch 135 through an input line 134. Thus, normally a switching stage 142 connects the line 134 with the output line 40. In dependence upon the design of the threshold value switch 35, a signal will be obtained at its output either when the input signal exceeds or falls below a predetermined threshold value. Thereby, its threshold value is chosen and adjusted in such a manner that it corresponds to an upper or a lower threshold value. The signal at the output of the threshold value switch 135 closes, on the one hand, immediately the switching stage 143, whereas the switching stage 142 is opened through the inversion member 44 so that the measuring signal from the line 33 reaches the output line 40, instead of the signal from the line 134.

The above described embodiments of an evaluation circuit for an extreme value are, in principle, only adapted to compare two measuring values. In order to be able to compare more than two measuring values (for example in the case of a third pressure pelleter operated in series), it would be necessary, in applying this type of circuit, to connect at least two of such comparator stages in series. It is, however, absolutely possible to compare simultaneously also three or mor measuring values within a single circuit as will now be described with reference to the embodiments (c) and (e). In this case, there is a circuit of a plurality of rectifiers or electronic valves, arranged in parallel, which are merely represented as simple diodes D1, D2 and D3 and are connected in a similar way, as is known from dot indicator displays in LED circuits. Accordingly, all modifications, known from such dot indicator circuits, may be applied also in this case, if necessary. It is, however, to be understodd that, in the case of the signals occuring in a circuit of a pellet press, suitably appropriate amplification means may be interposed. Supposing now that a voltage U1 of three input voltages U1, U2 and U3 is the minimum voltage, whereas the voltage U3 is the maximum voltage. Then, the diode D3 in the circuit (c) will transmit its signal U3, whereas the diodes D1 and D2 will consequently be blocked. Thus, the signal of the respective maximum value will pass in this circuit to the output line 40.

In the embodiment (e), the circuit is, in principle the same, but the diodes D1, D2 and D3 have reversed polarity so that the function is inversed. Consequently, the minimum voltage U1 will pass to the output line 40, the diode D1 being connected through, whereas the diodes D2, D3 will block. In both embodiments (c) and (e), the resistance R6 may be made adjustable. If it is said that in the case of the embodiment (c) the signal U3 of maximum value can pass, whereas in the case of the embodiment (e) the voltage U1 of minimum value will be transmitted to the ouput line 40, it is evident that the voltage drop over the respective diode has to be considered. In comparison with that, the circuits according to the embodiments are substantially free of losses. It is also clear that in the case of the embodiments (c) and, (e) always that diode will open onto which the signal of the corresponding extreme value is applied so that the signal of the respective extreme value is selected from a plurality of input signals by means of a relatively simple circuit.

It is within the scope of the present invention that not only the features described may be combined with each other as well as with features of the prior art, but numerous modifications are also possible; for example, it may be favorable in an arrangement of two pellet presses 301, 401 connected to each other, if both presses 301, 401 have a common lifting appliance for lifting the dies (or other heavy parts) of both presses. This can be realized in such a manner that approximately in the middle of the arrangement (with respect to FIG. 13), between the presses 301, 401, a mast is arranged towards the front side of the inlet chutes 6, the mast comprising an overhang beam pivotal to both sides onto which a lifting appliance is mounted to be selectively turned to the press 301 or to the press 401. Another possibility may consist in that a rail is arranged transversely above the two presses 301, 401, a lifting appliance, e.g. a lifting tackle, being displaceable in the manner of a crane carriage to one or the other press 301 or 401.

A further favorable modification may consist in the case of FIGS. 13 to 16 in that that section of the screw feeder 203, which extends between the inlet hopper 202 and the steam-conditioner 104, may be omitted, the screw feeder 203 feeding only in one direction into the steam-conditioner 204 during parallel operation of both presses 301, 401, but is switched off in the case of an operation in series. In this case, the interruptor stage 76 has to be arranged in the circuit of the motor 72, whereas the reversing stage 73 can be omitted. The screw feeder 103, however, feeds, in this case, either during operation in series and in parallel operation into the steam-conditioner 104. In this way, the design may be simplified.

Furthermore, a change-over facility, analogous to the change-over lid 77 (FIG. 15), may be also provided, for example, in an embodiment according to FIGS. 5, 6 or 9 to 11 in order to enable selectively an operation in parallel or in series, or even the operation of only one die or die surface.

A further possibility may consist in that to control the pressure exerted by the pressure rollers, or to control the number of revolutions of the drive of the pressure pelleter as a function of the measuring values obtained from the measuring circuits 82 and 182, as already has been proposed for a single pressure pelleter.

What is claimed is:

1. An an arrangement for making food pellets from a raw material, comprising:
   die means having holes corresponding toe the outer shape of the pellets to be formed by said die means;
   supply means for feeding the raw material into said die means;
   pressure exerting means for pressing said raw material through the holes of said die means to form pellet; and
   output means for transporting the pellets fromed by the die means from the same, said output means comprising a feedback arrangement for feeding at least part of said pellets back into said die means to be pelleted again, said feeding arrangement having an inlet end and a discharge end.

2. An arrangement as claimed in claim 1, wherein said die means comprise a die, said feeding arrangement including back feeding means to feed the pellets back to said die.

3. An arrangement as claimed in claim 1, further comprising skimmer means for cutting the pellets leaving the die means, said skimmer means being connected to said inlet end.

4. An arrangement as claimed in claim 1, wherein said feeding arrangement comprise screw means.

5. An arrangement as claimed in claim 1, said discharge end is arranged past at least part of said supply means.

6. An arrangement as claimed in claim 1, wherein said die means comprise at least first and second die surfaces, said feeding arrangement leading the pellets formed by said first die surface to said second die surface.

7. An arrangement as claimed in claim 6, wherein said first and second die surfaces are arranged in vicinity to each other.

8. An arrangement as claimed in claim 7, wherein said first die surface is formed by a first die, said second die surface being formed by a second die surrounding said first die, each of said first and second dies having an inner surface and an outer surface.

9. An arrangement as claimed in claim 8, wherein said first and second dies are concentrically arranged to each other.

10. An arrangement as claimed in claim 8, wherein said pressure exerting means include said first die arranged so that its outer surface engages the inner surface of said second die.

11. An arrangement as claimed in claim 10, further comprising drive means for said second die, said drive means being in engagement with the outer surface of said second die.

12. An arrangement as claimed in claim 7, wherein said first and second die surfaces are cylindrical and are axially offset relative to each other.

13. An arrangement as claimed in claim 12, further comprising skimmer means arranged at least on said first die surface and being displaceable relatively to the latter.

14. An arrangement as claimed in claim 1, wherein said feeding arrangement comprises quality control and separating means having an input and at least two outputs, one of them for pellets corresponding to a predetermined nominal quality, the other one for pellets which do not correspond to said nominal quality and leading to said die means.

15. An arrangement as claimed in claim 1, further comprising support means for rotatably supporting said die means, said die means being cylindric.

16. In an arrangement for making food pellets from a raw material, comprising:
first die means having holes corresponding to the outer shape of the pellets to be formed by said first die means;
supply means for feeding the raw materials into said first die means;
first pressure exerting means for pressing said raw material through the holes of said first die means to form pellets;
output means for transporting the pellets formed by the first die means from the same, said output means including first and second output openings;
second die means having holes corresponding to the outer shape of the pellets to be formed by said second die means;
input means leading to said second die means; second pressure exerting means for pressing material through the holes of said second die means;
selector means for selectively connecting said input means with said supply means and with said output means, said selector means including shutter means for selectively closing one of the openings in said output means, while giving free the other one of said openings for selectively effecting double-pelleting of the new material.

17. An apparatus as claimed 16, wherein said supply means comprise first and second supply ends, the first supply end being connected to said first die means, the second suply end being connected to said second die means, and wherein said selector means comprise switching means for said supply means for selectively supplying raw material to said second die means.

18. In an arrangement for making food pellets from a raw material, comprising:
first die means having holes corresponding to the other shape of the pellets to be formed by said first die means;
first pressure exerting means for pressing said raw material with a pressure of a first value through the holes of said first die mean to form pellets;
supply means for supplying the raw materials to said first die means, said supply means supplying material at a rate of a third valve and including conditioning means for treating the material to reach a conditioning parameter of a fourth value;
first drive means for imparting relative movement of said first die means and said first pressure means with a relative speed having a second value;
output means for transporting the pellets formed by the first die means from the same;
second die means having holes correspondig to the outer shape of the pellets to be formed by said second die means;
input means leading to said second die means; second pressure exerting means for pressing material with a pressure of a fifth value through the holes of said second die means;
second drive means for imparting relative movement of said second die means and said second pressure means with a relative speech having a sixth value;
control means for controlling at least one of said values said control means including power measuring means for measuring at least one parameter representative of the power of the drive means assigned to at least of said first and second die and pressure means, said measuring means providing a measuring signal; and
control loop means for evaluating said measuring signal and being at least one control of said values.

19. An arrangement as claimed in claim 18, wherein said drive means comprise at least one electric motor, said power measuring means comprising current measuring means for measuring the current taken up by said electric motor.

20. An arrangement as claimed in claim 1, wherein said control means are arranged to control said third value.

21. An arrangement as claimed in claim 18, wherein said control means are arranged to control said fourth value.

22. An arrangement as claimed in claim 18, wherein said power measuring means are arranged to measure at least one parameter representative for the power of said first and second drive to provide a first and a second measuring signal, the arrangement further comprising comparing means receiving said first and second measuring signals for determining the one which approaches to one extreme, and supplying the measuring signal determined to said control loop means.

23. An arrangement as claimed in claim 22, wherein said comparing means determine the measuring signal approaching to a maximum.

24. An arrangement as claimed in claim 18, wherein at least one of said drive means are arranged to drive a respective one of said die means, said die means being cylindric.

* * * * *